Figure 1:
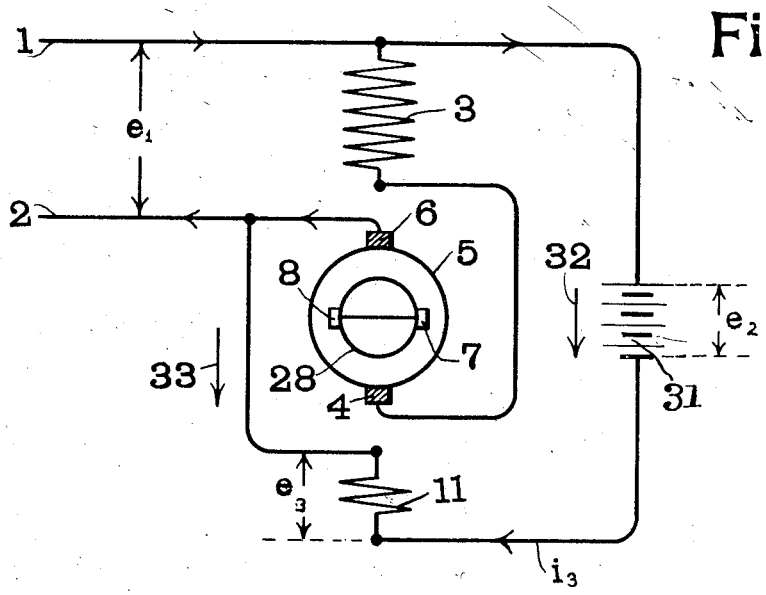

V. A. FYNN.
DYNAMO ELECTRIC MACHINE.
APPLICATION FILED NOV. 29, 1909.

1,002,383.

Patented Sept. 5, 1911.

3 SHEETS—SHEET 1.

WITNESSES:
L. L. Mead.
W. H. Alexander

INVENTOR
Valère A. Fynn.
BY Fowler & Huffman
ATTORNEYS

V. A. FYNN.
DYNAMO ELECTRIC MACHINE.
APPLICATION FILED NOV. 29, 1909.

1,002,383.

Patented Sept. 5, 1911.

3 SHEETS—SHEET 3.

WITNESSES:
L. L. Mead.
W. H. Alexander.

INVENTOR
Valère A. Fynn.
BY Fowler & Huffman
ATTORNEYS

UNITED STATES PATENT OFFICE.

VALÈRE ALFRED FYNN, OF LONDON, ENGLAND, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,002,383.   Specification of Letters Patent.   Patented Sept. 5, 1911.

Application filed November 29, 1909. Serial No. 530,285.

*To all whom it may concern:*

Be it known that I, VALÈRE ALFRED FYNN, a subject of the King of England, residing at London, England, have invented a certain new and useful Dynamo - Electric Machine, of which the following is such a full, clear, and exact description as will enable any one skilled in the art to which it appertains to make and use the same, reference being had to the accompanying drawings, forming part of this specification.

My invention relates particularly to continuous current generators.

The objects are to provide a generator which will yield an E. M. F. of a magnitude independent of the speed at which the machine is driven and of a constant direction independently of the direction of rotation. Such a machine is more particularly intended to generate continuous currents for use in combination with certain train lighting systems, for windmill operated plants and the like. In order to achieve these objects I provide a neutralized self-excited dynamo in which the exciting circuit is closed on itself and is at least partly disposed on the rotor and in which the exciting E. M. F. is generated in said rotor by rotation in a magnetic field to which I will refer as the teaser flux. According to this invention I make the magnitude of said teaser flux dependent on the difference of two E. M. F.'s, the smaller of these being an E. M. F. generated by the machine itself and the other being an independent E. M. F. derived from any desired source. If this independent E. M. F. is a constant one then the maximum variation of the working E. M. F. generated in my machine, when driven at any speed equal or superior to a given minimum speed, will not exceed the E. M. F. which is required at the terminals of the teaser flux producing winding in order to allow the necessary exciting current to be generated in the short-circuited field winding at the minimum speed for which the machine is built. Thus if the maximum E. M. F. required at the terminals of the teaser winding is one volt then the difference between the voltage generated in my dynamo when running at its minimum speed and when running at an infinitely great speed will also be only one volt provided the independent E. M. F. included in the teaser circuit remains constant throughout. If the independent E. M. F. is made to vary to the extent of one volt increasing by that amount as the speed decreases down to the minimum speed then the voltage generated in my dynamo will remain constant throughout. To whatever extent the independent E. M. F. is caused to vary during the operation of the machine the E. M. F. generated in the dynamo will never differ from the independent E. M. F. by more than the E. M. F. at the terminals of the teaser flux producing winding. This E. M. F. can be reduced by reducing the resistance of the teaser flux producing winding and by decreasing the reluctance of the magnetic path provided for the teaser flux. For a given reluctance of the magnetic path and a given resistance of the teaser flux producing winding the E. M. F. required at the terminals of said winding will increase with decreasing speed. For this reason it will be necessary to settle on a minimum speed below which the machine should not be run. If it is run below that speed then the voltage generated in the machine will drop rapidly, of course, becoming zero at standstill. The minimum speed can, however, be chosen sufficiently low to satisfy all practical requirements. The independent E. M. F. can be so varied as to at least partly compensate for the ohmic drop in the mains. The exciting E. M. F. being generated by the rotation of the rotor conductors in the teaser flux, the direction of that E. M. F. will alter when the direction of rotation is altered and the direction of the working E. M. F. will consequently be the same for either direction of rotation.

Figure 3:
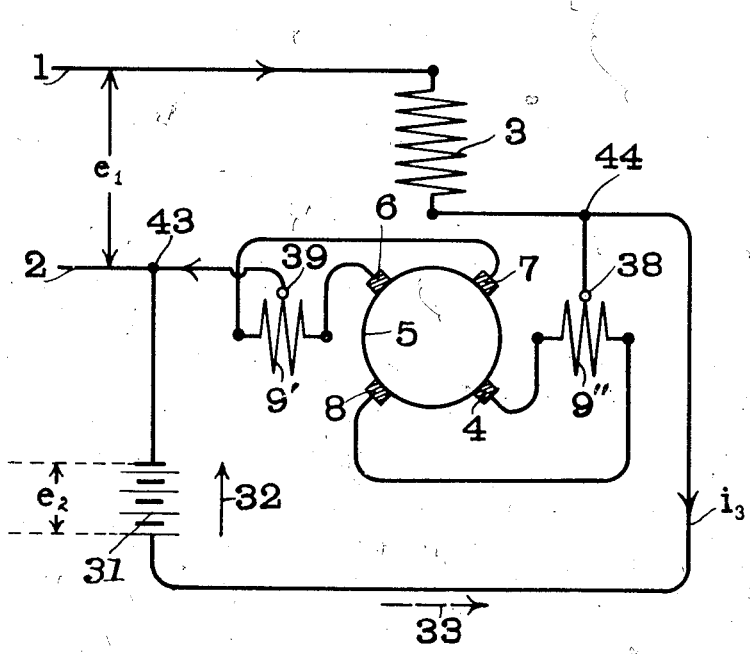
Figure 2:
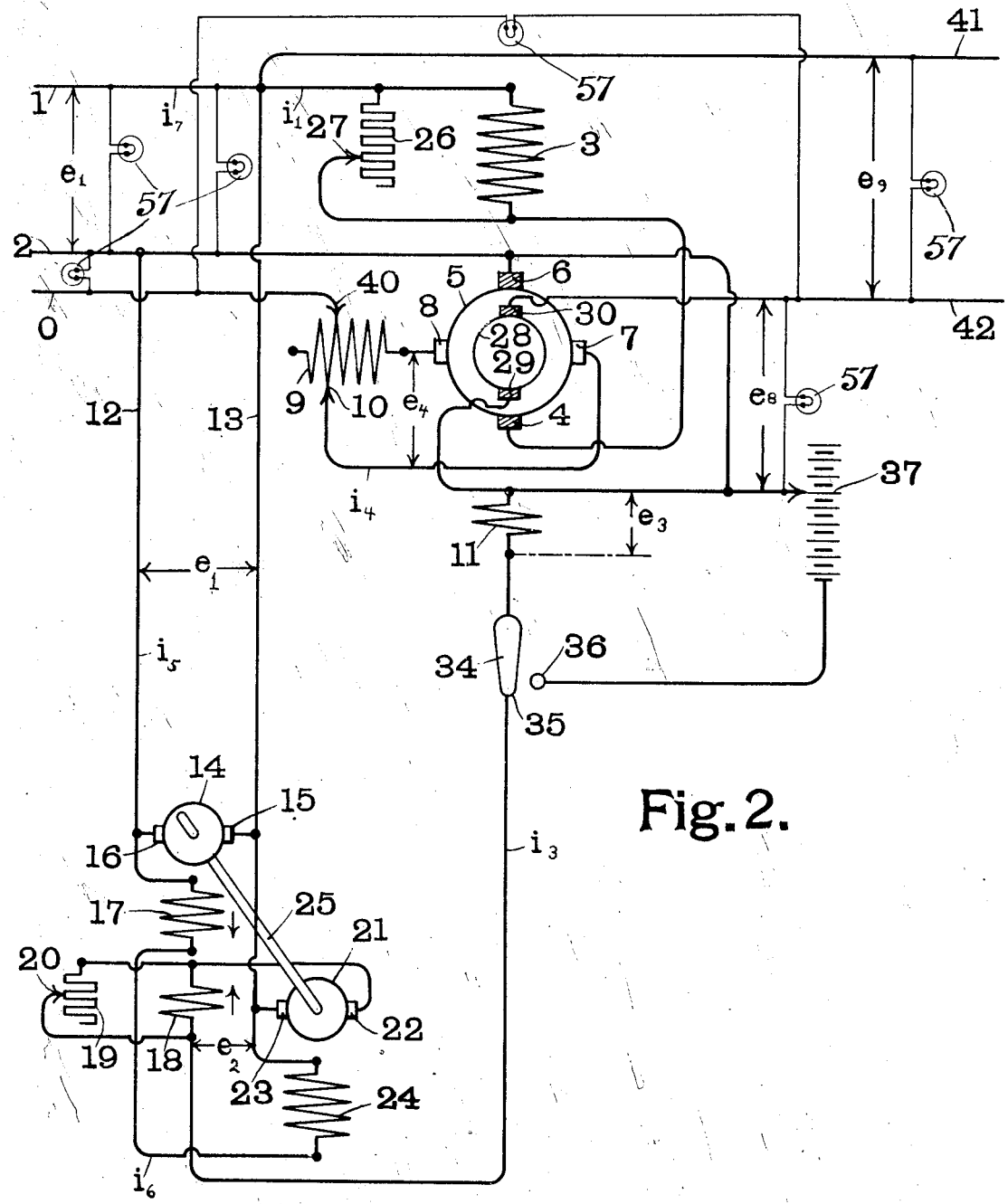
Figure 4:
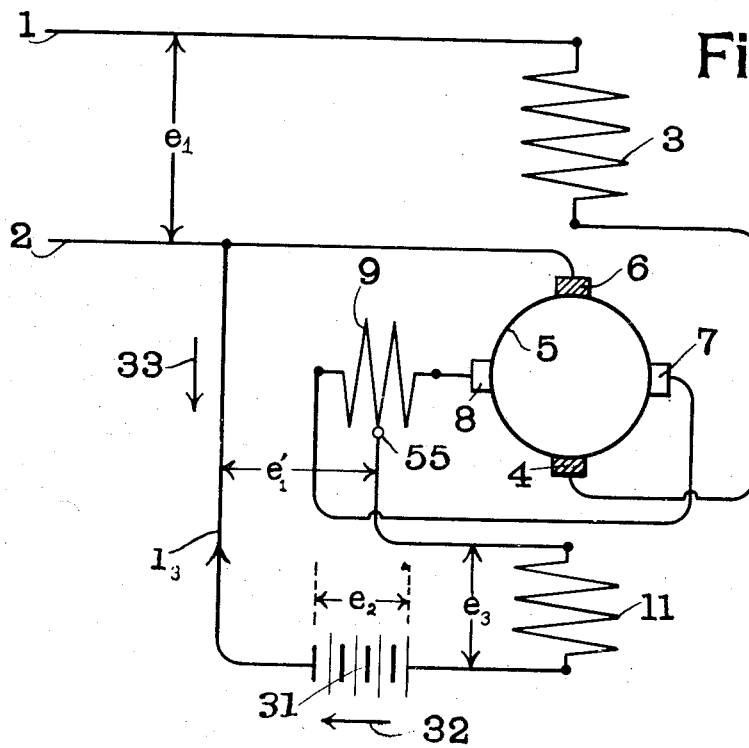

In the accompanying drawings, Figure 1 shows a simple form of this invention; Fig. 2 shows another form of this dynamo, the independent E. M. F. being derived from a motor generator; Fig. 3 shows a different brush arrangement and connections for utilizing the armature winding itself for producing the teaser flux; Fig. 4 shows a way of impressing on the teaser winding a part only of the working E. M. F. generated in the main dynamo, and Fig. 5 indicates constructive features of such a dynamo.

Referring to Fig. 1, the rotor carries by way of example two independent windings 5 and 28 and the stator has two coaxial windings 3 and 11. The neutralizing winding 3 is connected in series relation and in opposition to the rotor winding 5 along an axis approximately coinciding with that of 3 and by way of the brushes 4 and 6. Its ampere turns are preferably chosen a little greater than the rotor ampere turns along the axis 4, 6. This is the working circuit of the dynamo. The rotor winding 28 is closed on itself by way of the brushes 7, 8; this is the exciting circuit of the machine. The teaser winding 11 is connected across the mains 1, 2 and any desired source of E. M. F. such as the storage battery 31 is included in the circuit of 11. This source produces the independent E. M. F. $e_2$ and a necessary condition is that $e_2$ be connected in opposition to $e_1$, which is the E. M. F. of the mains. Their resultant $e_3$ produces the current $i_3$ through the teaser winding 11. The respective directions of $e_2$ and $e_1$ in the circuit containing 11 are indicated by the arrows 32, 33. In Fig. 1 the exciting E. M. F. responsible for the exciting current is generated in 28 at the brushes 7, 8 and by rotation in the flux due to 11.

In Fig. 2 is shown the preferred arrangement of circuits, the main dynamo being arranged to deliver three E. M. F.'s, $e_1$, $e_8$, and $e_9$, of differing magnitude and all independent of the speed and also being capable of feeding a three-wire system of distribution. One working circuit comprises the neutralizing winding 3 and the rotor winding 5; the ampere turns in 3 can be regulated at 27 by means of the resistance 26 shunting 3. The E. M. F. of this working circuit is $e_1$. The one exciting circuit comprises the rotor winding 5 between the brushes 7, 8 and the field winding 9, disposed on the stator and preferably displaced from 3 by $180/n$ degrees, where $n$ stands for the number of poles of the machine. The ampere turns in 9 can be varied for instance, by varying the active number of turns in 9 at 10. The use of this additional field winding makes it possible to reduce the magnitude of the exciting current while retaining the same number of ampere turns thereby facilitating commutation at the exciting brushes 7, 8. By revolution of the rotor conductors in the teaser flux an exciting E. M. F. is generated at the brushes 7, 8 and if those brushes are short-circuited a certain exciting current will flow in the winding 5. The magnitude of this current will depend on the ohmic resistance of the short-circuit as long as the exciting E. M. F remains constant. The exciting ampere turns will depend on said current and on the number of volt turns of the rotor winding 5. If the number of exciting turns be doubled by including the winding 9 between the brushes 7, 8, then the exciting current will be reduced. If the resistance of the exciting circuit has been doubled by the addition of 9 then the exciting current will be halved, provided the exciting E. M. F. has remained constant. This smaller current is of course easier to commutate and since it flows in double the number of turns its magnetizing effect is the same as that of the larger current flowing in the winding 5 only. Since the exciting brushes 7, 8 rest on the rotor winding which does duty as armature or working winding, then a conductor 0 connected at 40 to any point of 9 or to either of the exciting brushes will halve the potential between the mains 1 and 2. Mains 1, 2, 0 can, therefore, be connected to a three-wire system.

The second working circuit starts at main 42 and comprises a second rotor winding 28 connected in series relation with 5 by way of the brushes 30, 29, 6, 4 and ends at main 41 after passing through 3. The E. M. F. $e_1$ due to 5 is added to $e_8$ due to 28, resulting in the E. M. F. $e_9$ impressed on the mains 41, 42 which are thus fed quite independently of the mains 1, 2 and 0. A fourth E. M. F. about equal to one-half of $e_1 + e_8$ is also available between the mains 0 and 42. Translating devices 57 are shown connected across the various differing but practically constant potentials obtainable from this dynamo.

The teaser flux is produced by the teaser winding 11 preferably disposed in the axis of 3. The teaser winding is connected on one side to main 2 near brush 6 and on the other to main 1 by way of switch 34 point 35, series exciting winding 18 of the motor 14, brushes 22, 23 of dynamo armature 21 and wire 13. The dynamo 21 is driven by the shunt motor 14 connected in parallel to the mains 1, 2. The shunt winding 17 of the motor is connected by way of example in series with the shunt winding 24 of the dynamo 21 and across the mains 1, 2. As the load on the dynamo 21 increases owing to the larger current taken by 11 with decreasing speed of the main machine, the speed of 14 is liable to diminish thus decreasing the independent E. M. F. $e_2$ generated by 21 and included in the teaser circuit in opposition to the E. M. F. $e_1$ derived from the mains 1, 2. To avoid this, a field winding 18 has been disposed on motor 14 and so connected in series with 21 and 11 as to produce a magnetization opposed to that due to 17 thereby increasing the motor speed. By this means it is possible to so vary $e_2$ that $e_1$ will remain practically constant. It is best to disconnect the main dynamo from the circuit after its speed has reached that critical speed at which adequate control of $e_1$ becomes impossible by the means herein set forth.

If the connections are such as shown in Fig. 2 then the auxiliary dynamo 21 must generate an E. M. F. slightly greater than $e_1$ and must be able to carry the maximum current required by 11.

In order to prevent an undue rush of current when connecting this novel dynamo to the translating devices, it is desirable to first bring it up to near the critical speed and to initiate the self-exciting process by temporarily impressing on 11 an E. M. F. of suitable magnitude (about maximum $e_3$) derived from any desired source such as the primary or secondary battery 37. This is achieved by moving switch 34 on to point 36. After the main dynamo has been connected to the mains and 14 and 21 are running, switch 34 can be moved on to point 35, thus reëstablishing the normal connections.

In Fig. 3 the brush arrangement differs from the previous in that both sets of brushes, 4, 6 and 7, 8 are displaced by $90/n$ degrees from the axis of 3, the sets of brushes being displaced in opposite directions from that axis. 6 is connected to 7 by way of the field winding 9' and 8 is connected to 4 by way of the field winding 9''. Brushes 6, 7 and 8, 4 could be short-circuited in pairs as named. Those portions of 5 which are comprised between the brushes 6, 7 and 8, 4 do duty as field winding, the rest do duty as armature or working windings and are connected in series with the neutralizing winding 3 by way of points 38 and 39 situated midway in the windings 9' and 9'' respectively. Being thus connected, the working current will flow through the field windings 9' and 9'' without producing any magnetization. That part of the rotor winding which does duty as armature or working winding is in this case also made use of as teaser winding. To this end the independent E. M. F. $e_2$ derived from 31 is connected to the working circuit at the points 43 and 44 and in opposition to the E. M. F. $e_1$ generated in those portions of 5 which do duty as armature or working conductors. The source of independent E. M. F. 31 may conveniently be a secondary battery.

In Fig. 4 the working circuit comprises the neutralizing winding 3 and the rotor winding 5 connected in series relation by way of the working brushes 4, 6. The locally closed exciting circuit comprises the stator field winding 9 connected in series with 5 by way of the exciting brushes 7, 8 and along an axis displaced from that of 3. The E. M. F. $e'_1$ impressed on 11 is only about one-half of the terminal E. M. F. $e_1$ of the dynamo and is derived from main 2 and a point 55 of the field winding 9. The other E. M. F. impressed on 11 is $e_2$ and it is derived from any desired independent source 31 and opposes $e'_1$. Impressing on 11 an E. M. F. smaller than the total working E. M. F. $e_1$ of the dynamo permits the capacity of the source of the independent E. M. F. $e_2$ to be reduced. By suitably selecting the location of point 55 the excitation of the main dynamo can be made to vary in accordance with the variations of $i_3$ in 11.

Figure 5:
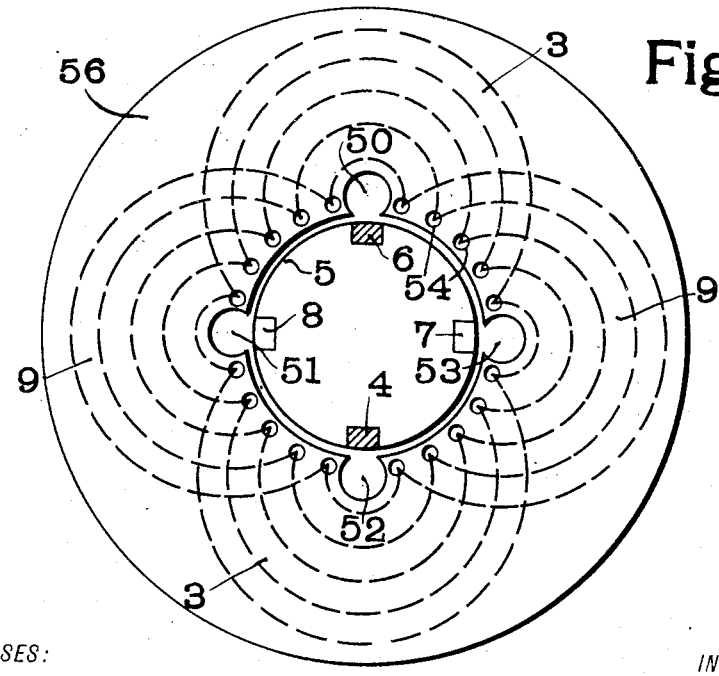

Fig. 5 diagrammatically indicates how the stator 56 of such a dynamo can be constructed and how some of the windings can be located thereon. The commuted winding 5 on the rotor is supposed to be of the Gramme ring type and it is assumed that the brushes 4, 6, 7, 8, bear directly on that winding. The coils undergoing commutation are therefore situated immediately under these brushes.

To improve the commutation, openings 50, 51, 52, 53 are provided in the stator 56 above the commuted coils. The stator windings can be located in slots such as 54. A possible arrangement of the neutralizing winding 3 and of the stator field winding 9 is indicated in dotted lines. The openings 50 and 52 corresponding to the coils of 5 being commuted under the working brushes 4, 6 can be left out particularly when the neutralizing winding 3 is designed to have more ampere turns than there are working ampere turns on 5.

Having fully described my invention, what I claim as new and desire to secure by Letters Patent of the United States, is:

1. In a dynamo electric machine, a working circuit and an exciting circuit, an independent source of E. M. F. and means for producing a teaser flux along an axis displaced from the axis of the exciting circuit, the magnitude of said teaser flux depending upon the difference between the independent E. M. F. and an E. M. F. derived from the working circuit.

2. In a dynamo electric machine, the combination of a stator, a rotor, a working circuit at least partly disposed on the rotor, exciting brushes on the rotor, an independent source of E. M. F., and means for producing a teaser flux along an axis displaced from the axis of the exciting brushes, the magnitude of said flux depending upon the difference between the independent E. M. F. and an E. M. F. taken from the working circuit.

3. In a dynamo electric machine, the combination of a stator carrying a neutralizing winding, of a rotor, working brushes on the rotor connected in series relation with the neutralizing winding, exciting brushes on the rotor, an independent source of E. M. F., and means for producing a teaser flux along an axis displaced from the axis of the exciting brushes, the magnitude of said flux depending on the difference between the independent E. M. F. and an E. M. F. derived from the working circuit.

4. In a dynamo electric machine, the combination of a stator carrying a neutralizing winding, of a rotor, working brushes on the rotor connected in series relation with the neutralizing winding, a local exciting circuit at least partly disposed on the rotor, an independent source of E. M. F., and means for producing a teaser flux along an axis displaced from the axis of the exciting circuit, the magnitude of said flux depending on the difference between the independent E. M. F. and an E. M. F. derived from the working circuit.

5. In a dynamo electric machine, a working circuit and an exciting circuit, a motor-generator producing an independent E. M. F., said motor-generator being operated from the working circuit, and means for producing a teaser flux along an axis displaced from the axis of the exciting circuit, the magnitude of said teaser flux depending upon the difference between the independent E. M. F. and an E. M. F. derived from the working circuit.

6. In a dynamo electric machine, the combination with a stator carrying a neutralizing winding, of a rotor, working brushes on the rotor connected in series relation with the neutralizing winding, an exciting circuit at least partly disposed on the rotor, a motor operated from the main working circuit, an auxiliary dynamo driven by said motor, a shunt field winding on the motor and one on the auxiliary dynamo, both shunt windings being fed from the working circuit, a series field winding on the motor connected in series with the auxiliary dynamo, and means for producing a teaser flux along an axis displaced from the axis of the exciting circuit, the magnitude of said flux depending on the difference between the E. M. F. derived from the auxiliary dynamo and an E. M. F. derived from the rotor.

7. In a dynamo electric machine, the combination of a stator carrying a neutralizing winding and a teaser winding, a rotor, working brushes on the rotor, connected in series relation with the neutralizing winding, a local exciting circuit at least partly disposed on the rotor, an independent source of E. M. F., said independent E. M. F. being impressed on the teaser winding in opposition to an E. M. F. derived from the working circuit.

8. In a dynamo electric machine, the combination with a stator provided with a neutralizing winding and a field winding displaced therefrom, of a rotor, working brushes on the rotor connected in series relation with the neutralizing winding, exciting brushes on the rotor connected in series relation with the field winding, an independent source of E. M. F., and means for producing a teaser flux along an axis displaced from the axis of the exciting circuit, the magnitude of said flux depending on the difference between the independent E. M. F. and an E. M. F derived from the working circuit.

9. In a dynamo electric machine, the combination with a stator carrying a neutralizing winding, of a rotor provided with a main winding and an auxiliary winding, working brushes on said main rotor winding connected in series relation with the neutralizing winding, exciting brushes on the main rotor winding, an independent source of E. M. F., and means for producing a teaser flux along an axis displaced from the axis of the exciting brushes, the magnitude of said flux depending on the difference between the independent E. M. F. and an E. M. F. derived from the rotor.

10. In a dynamo electric machine, the combination of a stator carrying a neutralizing winding, a rotor provided with a main winding and an auxiliary winding, working brushes on each of said rotor windings, both rotor windings being connected in series relation with the neutralizing winding through said brushes, exciting brushes on one of the rotor windings, an independent source of E. M. F., and means for producing a teaser flux along an axis displaced from the axis of the exciting brushes, the magnitude of said flux depending on the difference between the independent E. M. F. and an E. M. F. derived from the rotor.

In testimony whereof, I have hereunto set my hand and affixed my seal in the presence of the two subscribing witnesses.

VALÈRE ALFRED FYNN. [L. S.]

Witnesses:
E. E. HUFFMAN,
ELIZABETH BAILEY.